(12) United States Patent
Malreddy et al.

(10) Patent No.: US 9,374,742 B1
(45) Date of Patent: Jun. 21, 2016

(54) METHODS AND SYSTEMS FOR ESTABLISHING A CIRCUIT-SWITCHED FALLBACK SCAN-LIST

(71) Applicant: Sprint Spectrum L.P., Overland Park, KS (US)

(72) Inventors: Muralidhar Malreddy, Overland Park, KS (US); Ryan S. Talley, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 23 days.

(21) Appl. No.: 14/480,749

(22) Filed: Sep. 9, 2014

(51) Int. Cl.
*H04W 36/00* (2009.01)
*H04W 36/14* (2009.01)

(52) U.S. Cl.
CPC .......... *H04W 36/0055* (2013.01); *H04W 36/14* (2013.01)

(58) Field of Classification Search
USPC ................................................. 455/436–448
See application file for complete search history.

(56) References Cited

U.S. PATENT DOCUMENTS

| | | | | |
|---|---|---|---|---|
| 2009/0215452 A1* | 8/2009 | Balasubramanian . | H04W 48/16 | 455/434 |
| 2011/0319071 A1* | 12/2011 | Beppler | ................ | H04W 48/18 455/424 |
| 2014/0113636 A1* | 4/2014 | Lee | ....................... | H04W 36/00 455/437 |

* cited by examiner

*Primary Examiner* — Joel Ajayi

(57) ABSTRACT

In a communication system comprising a first base station of a plurality of base stations, a computing system may identify one or more other base stations of the plurality based on whether each of the one or more other base stations sits as a node on the same local area network (LAN) as the first base station, and perhaps based on other considerations, such as whether each of the one or more other base stations is geographically located near the first base station and whether each operates with a whitelist. The computing system may then cause the first base station to wirelessly transmit, to at least one user equipment device (UE) served by the first base station, a specification of the identified one or more base stations to enable the at least one UE to search for coverage of at least one of the specified one or more base stations.

16 Claims, 5 Drawing Sheets

METHODS AND SYSTEMS FOR ESTABLISHING A CIRCUIT-SWITCHED FALLBACK SCAN-LIST

BACKGROUND

Unless otherwise indicated herein, the description provided in this section is not prior art to the claims and is not admitted to be prior art by inclusion in this section.

To provide cellular wireless communication service, a wireless carrier typically operates a radio access network (RAN) that includes a number of base stations that radiate to define wireless coverage areas, such as cells and cell sectors, in which user equipment devices (UEs) (also known as wireless communication devices (WCDs)) such as cell phones, tablet computers, tracking devices, embedded wireless modules, and other wirelessly-equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

In general, a RAN may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or blocks of frequencies (e.g., frequency bands, such as 698-960 MHz, 1610-2025 MHz, etc.) and may define a number of air interface channels for carrying information between the base station and UEs. These channels may be defined in various ways, such as through frequency division multiplexing, time division multiplexing, and/or code-division multiplexing, for instance. By way of example, each coverage area may define a pilot channel, reference channel, or other resource on which the base station may broadcast a pilot signal, reference signal, or the like that UEs may detect as an indication of coverage and may measure to evaluate coverage strength. As another example, each coverage area may define one or more uplink control channels or other resources on which UEs may transmit control messages to the base station. And each coverage area may define one or more downlink control channels or other resources on which the base station may transmit control messages or other information to UEs. Further, each coverage area may define one or more traffic channels or other resources for carrying bearer communication traffic such (e.g., user traffic or application level traffic) as voice data and other data between the base station and UEs.

When a UE first powers on or enters into coverage of the RAN, the UE may scan for and identify a strongest pilot or reference signal and may register with the RAN by transmitting a registration request or attach request to a base station providing that signal. This registration process may serve to notify the RAN of the UE's presence in a particular coverage area and to facilitate network authentication of the UE. Once registered, the UE may then operate in an idle mode in which the UE monitors a downlink control channel to receive overhead information and to check for any page messages. In the idle mode, the UE may have no assigned traffic channel resources on which to engage in bearer communication.

When the RAN has a communication (such as a voice call or other traffic) to provide to a UE that is registered with the RAN but is operating in the idle mode, the RAN may page the UE in an effort to then facilitate assigning traffic channel resources to the UE. In particular, the RAN may transmit on the downlink a page message addressed to the UE. Assuming the UE receives this page message, the UE may then transmit to the RAN a page response message on the uplink. And upon receipt of the page response message, the RAN may then assign traffic channel resources to the UE, for use to carry the communication, thus transitioning the UE to a connected or active mode in which the UE can engage in the communication.

Likewise, when an idle UE seeks to initiate a communication (such as to place a voice call or engage in other bearer communication), the UE may transmit on the uplink to the base station an origination or connection request, and the RAN may then assign traffic channel resources to the UE for use to carry the communication, similarly transitioning the UE to a connected or active mode in which the UE can engage in the communication.

In communication systems that provide service under more than one air interface protocol, wireless carriers may implement functionality that allows UEs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, wireless carriers may implement "circuit-switched fallback" (CSFB) functionality, which allows UEs to operate by default on LTE and to switch over to operate on the older protocol to engage in voice calls.

Under CSFB, for instance, a hybrid CDMA/LTE UE may be arranged by default to scan for and register with an LTE RAN and to operate with its CDMA radio powered off, but to then engage in control signaling with the CDMA RAN via the LTE RAN, i.e., over the LTE air interface. To facilitate this, when the UE registers with the LTE RAN, the UE may also transmit to an interworking server (IWS), via the LTE RAN infrastructure (e.g., a mobility management entity (MME)), a registration request message, which the IWS may then send to the CDMA RAN to facilitate registration of the UE with the CDMA RAN. Further, an LTE base station of the LTE RAN may regularly broadcast a System Information Block #8 (SIB8) message containing data that indicates to a UE considering registering to be served by the LTE base station whether CSFB service is currently supported by the LTE base station.

When the CDMA RAN has a voice call to connect to the UE, the CDMA RAN may signal through the IWS to the LTE RAN to cause the LTE RAN to transmit a CSFB page message to the UE over the LTE air interface. After further CSFB signaling through the LTE RAN, the UE may then power on its CDMA radio and tune to the CDMA RAN to engage in the call over the CDMA air interface.

In one implementation of this CSFB process, for instance, once the UE receives the CSFB page message for the incoming CSFB call, the UE may transmit a CSFB extended service request message to its serving LTE base station as a request to set up the incoming CSFB call. In turn, the LTE base station may then send to the UE a list of CDMA coverage areas on which the CDMA RAN provides service, possibly specifying for each such coverage area its operating carrier and coverage area identifier (e.g., PN offset or physical cell identifier), so as to enable the UE to scan for coverage of the CDMA RAN as part of the CSFB process. Such a list may be referred to herein as a "CSFB scan-list" or simply a "scan-list." In some scenarios, after the UE sends the CSFB extended service request message to the LTE base station, the LTE base station may in turn send to the UE a control message that includes the scan-list. The control message may, upon receipt by the UE, trigger the UE to use the scan-list to scan for CDMA coverage.

Alternatively, in other scenarios, the SIB8 message broadcast by the LTE base station may include the scan-list, and/or may otherwise include information about the local CDMA RAN that the UE may interpret to determine one or more CDMA base stations of which the UE can scan for coverage. The SIB8 message can be received by the UE either before or after the UE sends the CSFB extended service request message, which may depend on how often the SIB8 message is broadcast. The UE may then scan for CDMA coverage in accordance with the scan-list included as part of the regularly-broadcast SIB8 message.

Furthermore, the UE may use its CDMA radio to scan for coverage of each of the listed coverage areas and transmit to the LTE base station a report of the strongest CDMA pilot signals and corresponding signal strengths that the UE detected. The LTE RAN may then pass those pilot signal measurements via the IWS to the CDMA RAN, and the CDMA RAN may use those measurements as a basis to determine a CDMA coverage area and traffic channel to assign to the UE. The CDMA RAN may then transmit a handover direction message via the IWS to the LTE RAN, which the LTE RAN may transmit to the UE, directing the UE to transition to CDMA to communicate in the assigned CDMA coverage area on the assigned traffic channel. The UE may then use its CDMA radio to tune to the assigned channel and to engage in the call via CDMA.

Likewise, when the UE is served by the LTE RAN and has a voice call to place, the UE may transmit over the LTE air interface to its serving LTE base station a CSFB extended service request message to request setup of an outgoing CSFB call, and the LTE base station may similarly send to the UE a scan-list of CDMA coverage areas on which the local CDMA RAN provides service. The UE may then similarly tune to CDMA and scan for coverage of each of the listed CDMA carriers, and report the strongest detected CDMA pilots to the LTE base station. And the CDMA RAN may similarly determine a CDMA coverage area and traffic channel to assign to the UE and transmit a handover direction message via the IWS to the LTE RAN for transmission to the UE. The UE may then similarly use its CDMA radio to tune to the assigned channel and to engage in the call via CDMA. This CSFB call setup process is generally quite efficient, as it allows the UE to engage in CDMA voice call setup through its existing LTE connection, without the need for the UE to be idling in CDMA coverage in the first place.

In an alternate CSFB process, after the UE sends a CSFB extended service request message as noted above, the UE's serving LTE base station may transmit to the UE a "release-and-redirect" message, which directs the UE to leave the LTE RAN and search for, find, and acquire connectivity in the CDMA RAN. To facilitate the UE searching for CDMA coverage, the LTE base station may also send to the UE a scan-list specifying CDMA coverage areas on which the local CDMA RAN provides service. In line with the discussion above, the SIB8 message broadcast by the LTE base station may include the scan-list, or the LTE base station may send to the UE a control message that includes the scan-list. In scenarios where the LTE base station sends the control message, the control message may be included as part of the release-and-redirect message or may be sent as a separate message. Once the UE has registered with the CDMA RAN, the CDMA RAN may then connect the CSFB call for the UE.

Generally, a wireless carrier may implement many "macro" base stations throughout its RAN, to provide UEs served by those base stations with widespread cellular coverage. In recent years, however, the cellular wireless industry has begun to expand beyond traditional macro base stations, by now providing users and companies with private base stations commonly known as "femtocells" (but also known by other names, such as microcells, femtocell base stations, and private base stations, among others). A typical femtocell may be a small device, about the size of a WiFi access point, which may connect with a broadband wireless connection to the Internet and establish a virtual private network (VPN) connection via the Internet with the wireless carrier's core network (e.g., with a femtocell controller on the wireless carrier's RAN). The femtocell may radiate to define a wireless coverage area in much the same way as a macro base station does. The femtocell uses the broadband Internet connection to connect with the wireless carrier's RAN and to provide much of the same functionality as a macro base station. A femtocell may provide service on a single carrier frequency (or on a single carrier frequency per technology, where multiple technologies are supported), and also transmit administrative messages and parameters that UEs can use to connect with the femtocell.

Femtocells serve the beneficial purpose of allowing subscribers to improve cellular coverage, perhaps in locations where the macro RAN does not provide adequate coverage. As such, individuals and companies may acquire femtocells from the wireless carrier and may position the femtocells at desired locations, such as within a house or throughout a corporate campus.

To help control where the wireless carrier provides service, the wireless carrier may require femtocells that access its RAN to register their geographic location with the wireless carrier, and the wireless carrier may authenticate and authorize the femtocells for use in the reported locations. For instance, when an individual subscriber acquires a femtocell from the wireless carrier for use in the in the subscriber's house, the wireless carrier may record in a profile record for the subscriber an indication of the geographic coordinates of the subscriber's home. When the subscriber powers up the femtocell, the femtocell may then determine its geographic location, or "geolocation," through use of a Global Positioning System (GPS) receiver for instance, and may transmit the geolocation via its broadband connection to the wireless carrier's RAN. The RAN may then verify that the reported geolocation matches the geolocation recorded in the subscriber's profile record and, only if so, may authorize the femtocell to operate as a base station for the wireless carrier's RAN. From time to time during operation, the femtocell may then again report its geolocation to the wireless carrier's RAN, and the wireless carrier may condition continued operation of the femtocell on the reported geolocation being valid.

Overview

An example CSFB system, such as the LTE/CDMA CSFB system described above, may comprise a first femtocell of a first RAN (e.g., an LTE RAN) and one or more second femtocells of a second RAN (e.g., a CDMA RAN). In such a system, it may be desirable for the first femtocell, after powering on at a given location, to engage in a process to determine which second femtocells it should specify in a scan-list. The scan-list can then be broadcast to or sent directly to a UE served by the first base station, thus enabling the UE to scan for coverage of the second RAN to facilitate the UE transitioning to engage in a CSFB call served by the second RAN.

Disclosed herein are methods and corresponding systems to facilitate such a process. In accordance with the disclosure, a femtocell system comprising a first femtocell of a first RAN and perhaps further comprising a femtocell server (e.g., a femtocell manager) arranged to communicate with the first femtocell, may establish which of a plurality of second femtocells of a second RAN should be included in a scan-list that the first femtocell will provide to at least one UE served by the first femtocell. Accordingly, the at least one UE may receive the scan-list and scan for coverage of at least one of the one or more second femtocells included in the scan-list to facilitate a transitioning to engage in a CSFB call served by the second RAN. It should be understood that, in some scenarios, the femtocell system may establish that only a single second femtocell of the plurality should be included in the scan-list. In other scenarios, however, the femtocell system may establish that multiple second femtocells of the plurality should be included in the scan-list.

The femtocell system could establish the scan-list in various ways. In one implementation, for instance, the first femtocell may sit as a node on a local area network (LAN), and the femtocell system may determine, for each of one or more second femtocells, whether the second femtocell sits as a node on the same LAN as the first femtocell. The femtocell system may then specify in the scan-list only second femtocells that sit as nodes on the same LAN as the first femtocell.

In practice, it may be useful for a femtocell system to consider LANs as a basis for establishing the scan-list for various reasons. For example, an entity such as a person, company, etc. may own or operate a particular LAN, as well as multiple femtocells that each sit as nodes on that particular LAN, such as the first femtocell and one or more second femtocells. As such, a consideration of whether a second femtocell sits as a node on the same LAN as the first femtocell may help ensure that both the first femtocell and the one or more second femtocells included in the scan-list are owned or operated by the same entity. As a more specific example, an occupant of a given location such as an apartment, school campus, business campus, or the like may own or operate, at that given location, a LAN as well as a first femtocell and one or more second femtocells that each sit as nodes on the LAN. As such, it may be desirable for that occupant or other occupants of the given location to have a CSFB call be served by a second femtocell that is also owned or operated by the occupant, rather than by a second femtocell that sits as a node on a LAN that is owned or operated by an occupant of a neighboring location. Other example scenarios and advantages are possible as well.

The femtocell system may establish the scan-list based on other considerations as well, in addition to or alternative to considering whether the first femtocell and second femtocells sit as nodes on the same LAN. In another implementation, for instance, the femtocell system may take into account a geolocation of each second femtocell. By way of example, in addition to the femtocell system determining whether second femtocells sit as nodes on the same LAN as the first femtocell, the femtocell system may determine a geolocation of one or more second femtocells. The femtocell system may then specify in the scan-list only second femtocells that (i) are located within a threshold distance from the given location of the first femtocell and (ii) sit as nodes on the same LAN as the first femtocell. Other considerations are possible as well.

Thus, in one respect, disclosed is a method operable in a communication system comprising a plurality of base stations, the plurality of base stations including a first base station that sits as a node on a LAN. In accordance with the disclosure, the method includes identifying, by a computing system, one or more other base stations of the plurality based at least in part on a determination of whether each base station of the one or more other base stations sits as a node on the same LAN as the first base station. The method then includes, responsive to the identifying, the computing system causing the first base station to wirelessly transmit, to at least one UE served by the first base station, a specification of the identified one or more other base stations to enable the at least one UE to search for coverage of at least one base station of the specified one or more base stations.

In another respect, disclosed is a method operable in a communication system comprising a first base station of a first RAN and one or more second base stations of a second RAN, where the first base station sits as a node on a LAN, and where the first base station is configured to transmit, to at least one UE served by the first base station, a scan-list specifying at least one of the second base stations, so as to enable the at least one UE to scan for coverage of the second RAN. In accordance with the disclosure, the method includes determining which one or more of the second base stations the first base station should specify in the scan-list, where the determining is based at least in part on whether the one or more second base stations each sit as a node on the same LAN as the first base station. The method then includes causing the first base station to specify the determined one or more second base stations in the scan-list.

In yet another respect, disclosed is a femtocell system that includes a first femtocell of a first RAN, wherein the first femtocell is arranged to serve UEs over a first air interface protocol, and wherein the first femtocell sits as a node on a LAN. The femtocell system also includes a femtocell server that is in communication with at least the first femtocell. The femtocell system further includes at least one processor, data storage, and program instructions stored in the data storage and executable by the at least one processor to cause the femtocell system to perform operations. The operations may include identifying a set of one or more second femtocells of a second RAN based at least in part on a determination that each second femtocell of the identified set is geographically located within a predefined threshold distance of the first femtocell, where each of the one or more second femtocells is arranged to serve UEs over a second air interface protocol. The operations may also include, of the identified set of second femtocells, identifying a subset of second femtocells based at least in part on a determination that each second femtocell of the identified subset either (i) sits as a node on the same LAN as the first femtocell or (ii) sits as a node on a different LAN, but does not operate with a whitelist. The operations may further include causing the first femtocell to wirelessly transmit, to at least one UE served by the first femtocell, a scan-list specifying the identified subset, to enable the at least one UE to scan for coverage of at least one second femtocell of the specified subset.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The present methods and systems described herein may be particularly useful when applied to femtocells, and will thus be described primarily in the context of a femtocell system as an example. It should be understood, however, that the present methods and systems can apply usefully to numerous other types of base stations as well, with respect to other types of systems and with many other variations. Further, the specific arrangements and processes described herein are set forth for purposes of example only, and other arrangements and elements (e.g., machines, interfaces, operations, orders of elements and operations, etc.) can be added, removed, combined, distributed, substituted, re-positioned, re-ordered, and/or otherwise changed. Still further, where this description refers to one or more operations being implemented on and/or by one or more devices, one or more machines, and/or one or more networks, it should be understood that one or more of such entities could carry out one or more of such operations by themselves or in cooperation, and may do so by application of any suitable combination of hardware, firmware, and/or software. For instance, one or more processors may execute one or more sets of programming instructions as at least part of carrying out one or more of the operations described herein.

Figure 1:
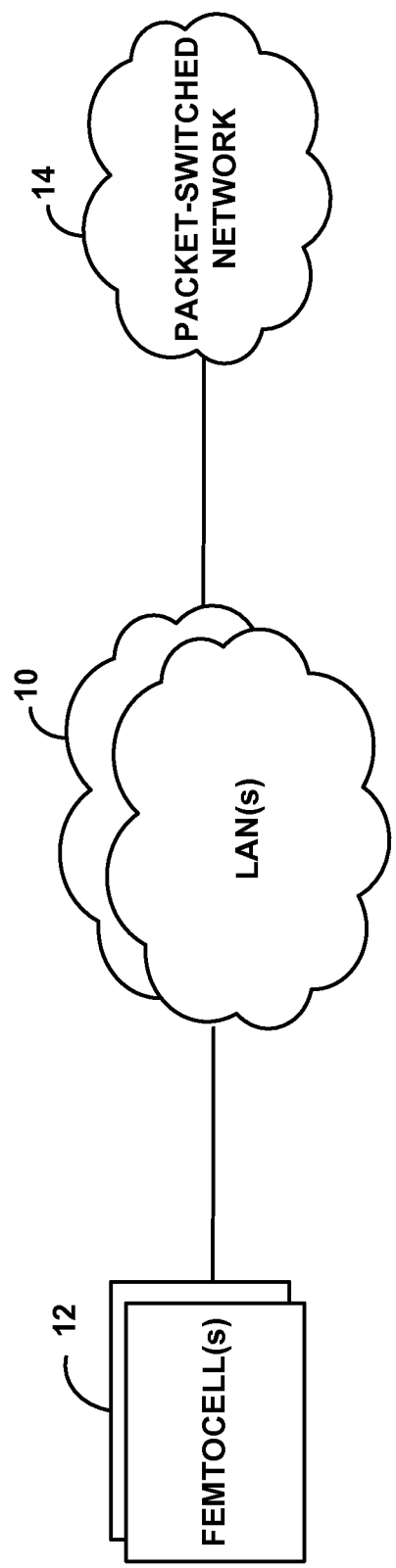
FIG. 1 is a simplified block diagram of an example communication system in which aspects of the present disclosure can be implemented.

Referring to the drawings, as noted above, FIG. 1 is a simplified block diagram of an example communication system in which aspects of the present disclosure can be implemented. The example communication system of FIG. 1 includes, by way of example, one or more LANs 10 on which one or more femtocells 12 may sit as nodes. For instance, in an arrangement where the one or more LANs 10 include a first LAN and a second LAN, a given femtocell of the one or more femtocells 12 may sit as a node on one or both of the first and second LANs.

The one or more LANs 10 may be situated in homes, offices, or elsewhere, and may function to locally connect various entities, such as the one or more femtocells 12, through wireless or wired means, and to provide those entities with connectivity to a packet-switched network 14 (e.g., the Internet). For instance, a LAN router or switch (not shown) that sits as a node on a given LAN of the one or more LANs 10 may have connections with the one or more femtocells 12, and may also be connected via a gateway, modem, or the like and an Internet service provider (not shown) with the packet-switched network 14. However, the LAN router and other entities that sit as nodes on the given LAN may have each assigned to them a private Internet Protocol (IP) address (i.e., a "local" IP address), which cannot be used outside the LAN to connect with packet-switched network 14.

Accordingly, in order for the given LAN and its entities to be identified by the packet-switched network 14, the LAN router or other entity on the given LAN may be arranged to perform network address translation (NAT), which translates private IP addresses on the given LAN to a single public IP address of the given LAN that identifies the given LAN for communication on the packet-switched network 14. As such, each of the one or more LANs 10 shown in FIG. 1 may have a public IP address for communication on the packet-switched network 14. Further, each femtocell, router, or other entity that sits as a node on a given LAN may share that LAN's public IP address, and thus each entity may have the same public IP address.

Figure 2:
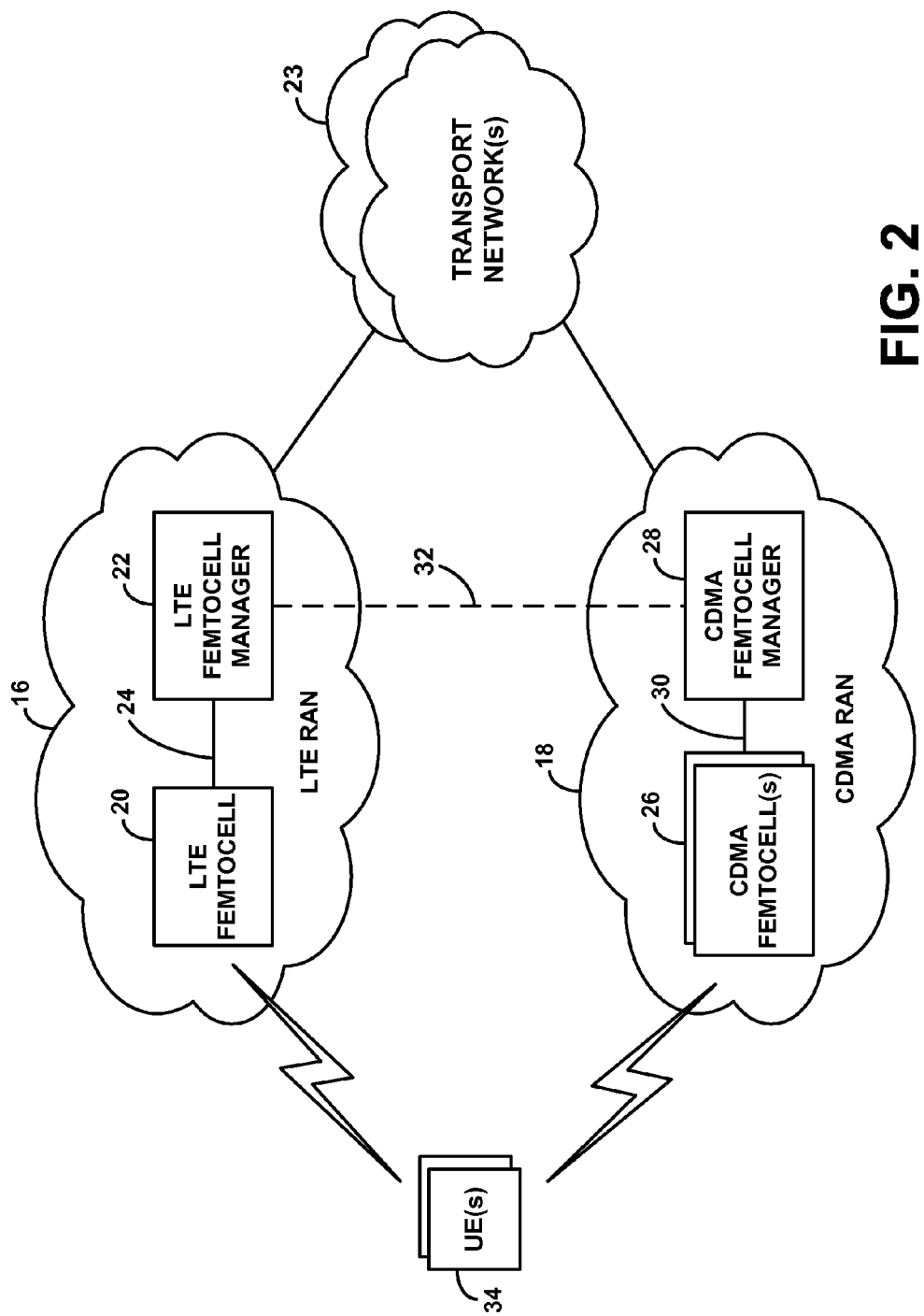
FIG. 2 is a simplified block diagram of a more specific communication system in which aspects of the disclosure can be implemented.

FIG. 2 is next a more specific block diagram of a more specific communication system in which aspects of the disclosure can be implemented. In particular, the example communication system of FIG. 2 is an example CSFB system including an example LTE RAN 16 and an example CDMA RAN 18 arranged to serve UEs over an LTE air interface protocol and a CDMA air interface protocol, respectively. It should be understood, however, that these example RANs could take other forms as well, using other air interface protocols. For instance, in other arrangements not described herein, a CSFB system may include an LTE RAN and a GSM RAN.

The LTE RAN 16 and the CDMA RAN 18 may be owned and operated by a common wireless carrier, and the carrier may configure the networks to interwork with each other so as to facilitate CSFB for instance. Alternatively, the networks may be owned and/or operated by separate wireless carriers, and those service providers may have an agreement with each other to allow for interworking between the networks, again to facilitate CSFB or the like.

The LTE RAN 16 in this CSFB system is shown including an LTE femtocell 20 and an LTE femtocell manager 22 (also known as an LTE femtocell server), and providing connectivity with one or more transport networks 23, such as the Internet and/or the PSTN. In practice, when the LTE femtocell 20 powers on in the LTE RAN 16, it may connect to a LAN (not shown) so as to sit as a node on that LAN. In line with the discussion above, the LTE femtocell 20 may then connect to the Internet through the LAN and establish a VPN connection 24 via the Internet with the LTE femtocell manager 22 on the LTE RAN 16. With an established VPN connection 24, the LTE femtocell 20 may then send to the LTE femtocell manager 22 a registration message indicating the LTE femtocell's geolocation, public IP address, whitelist, and/or other information. The LTE RAN 16 may then verify that the geolocation of the LTE femtocell 20 matches the location recorded in the subscriber's profile record and, only if so, may authorize the LTE femtocell to operate as a base station for the LTE RAN. From time to time during operation, the LTE femtocell 20 may then again report its geolocation to the LTE RAN 16, and the wireless carrier may condition continued operation of the LTE femtocell on the reported geolocation being valid.

The CDMA RAN 18 in this CSFB system is shown including one or more CDMA femtocells 26 and a CDMA femtocell manager 28 (also known as a CDMA femtocell server), and providing connectivity with the one or more transport networks 23. Similar to the process described above with respect to the LTE femtocell 20, when a given CDMA femtocell of the one or more CDMA femtocells 26 powers on in the CDMA RAN 18, it may connect to a LAN (not shown) so as to sit as a node on that LAN, which may be the same LAN as the LAN on which the LTE femtocell 20 sits as a node or a different LAN. The CDMA femtocell may then connect to the Internet through the LAN and establish a VPN connection 30 via the Internet with the CDMA femtocell manager 28 on the CDMA RAN 18. With an established VPN connection 30, the CDMA femtocell may then send to the CDMA femtocell manager 28 a registration message indicating the CDMA femtocell's geolocation, public IP address, private IP address, whitelist, and/or other information. The CDMA RAN 18 may then verify that the geolocation of the CDMA femtocell matches the location recorded in the subscriber's profile record and, only if so, may authorize the CDMA femtocell to operate as a base station for the CDMA RAN. From time to time during operation, the CDMA femtocell may then again report its geolocation to the CDMA RAN 18, and the wireless carrier may condition continued operation of the CDMA femtocell on the reported geolocation being valid.

In some network arrangements, including the arrangement shown in FIG. 2, the LTE femtocell manager 22 and the CDMA femtocell manager 28 may be separate entities arranged to communicate with each other over a communication link 32. However, it should be understood that in other network arrangements, the LTE femtocell manager 22 and the CDMA femtocell manager 28 may be integrated together as a single femtocell manager arranged to perform the operations of both the LTE femtocell manager and the CDMA femtocell manager discussed herein. Further, while the LTE and CDMA femtocells' respective geolocations, public IP addresses, private IP addresses, whitelists, and the like may be stored at each RAN's femtocell manager, as described above, it should be understood that such information may be stored at one or more other locations, such as one or more femtocell databases or other network entities, in addition to or alternative to the LTE and CDMA femtocell managers.

The CSFB system of FIG. 2 also shows one or more UEs 34 positioned in coverage of both the LTE RAN 16 and the CDMA RAN 18. When a given UE of the one or more UEs 34 first powers on or arrives in coverage of the LTE RAN 16, namely coverage of the LTE femtocell 20, the UE may scan for and detect coverage provided by the LTE RAN and may responsively register with the LTE RAN by transmitting a registration request message to the LTE femtocell. In response, the LTE RAN 16 may then record the fact that UE is present within coverage of the LTE femtocell 20, so as to facilitate paging the UE for calls or other incoming communications. Further, the UE may also transmit to an IWS (not shown) or other interworking entity, via the LTE RAN 16, a registration request message, which the IWS may then send to the CDMA RAN 18 to facilitate registration of the UE with the CDMA RAN. The UE, served by the LTE femtocell 20, may then idle within coverage of the LTE RAN 16.

In one example CSFB process, when the CDMA RAN 18 has a CSFB call or other communication to connect or otherwise provide to the UE, the CDMA RAN may then send a page message (or page message trigger) to the LTE RAN 16 to trigger paging of the UE via the LTE RAN. The LTE RAN 16 may then responsively page the UE by having the LTE femtocell 20 transmit a CSFB page message to the UE. In line with the example CSFB procedures described above, once the UE responds to this CSFB page, the UE may then send a CSFB extended service request message to the LTE femtocell 20 to request setup of the CSFB communication. And likewise, when the UE seeks to place a CSFB call, the UE may establish connectivity with the LTE femtocell 20 and may send a CSFB extended service request message to the LTE femtocell to request setup of that CSFB communication.

As discussed above, the LTE femtocell 20 may transmit to the UE a scan-list specifying at least one CDMA femtocell of the one or more CDMA femtocells 26 either before or after the UE sends the CSFB extended service request message to the LTE femtocell. For instance, the scan-list may be included as part of the SIB8 message broadcast by the LTE femtocell 20. In general practice, as discussed above, an LTE base station serving a UE (e.g., LTE femtocell 20) may regularly broadcast a SIB8 message. And, given the example association between the LTE RAN 16 and the CDMA RAN 18, the LTE femtocell 20 may be provisioned with the scan-list. Thus, the LTE femtocell 20 may include the scan-list as part of the regularly-broadcast SIB8 message, so as to enable the UE to scan for coverage of the CDMA RAN 18. Alternatively, the scan-list may be included as part of a control message that the LTE femtocell 20 can transmit to the UE. The control message, upon receipt by the UE, may trigger the UE to use the scan-list to scan for coverage of at least one CDMA femtocell specified by the scan-list, so that the UE can then engage in the CSFB communication in that coverage.

Upon receipt of the scan-list, the UE may then scan in search of the listed CDMA femtocell(s) and may report one or more strongest-detected pilot signals in a measurement report to the LTE femtocell 20. In response to the LTE femtocell 20 receiving the report, the LTE RAN 16 may then pass those pilot signal measurements via the IWS to the CDMA RAN 18, and the CDMA RAN may use those measurements as a basis to determine a CDMA femtocell and traffic channel to assign to the UE. The CDMA RAN 18 may then transmit a handover direction message via the IWS to the LTE RAN 16, which the LTE RAN may transmit to the UE, directing the UE to transition to CDMA to engage in the CSFB call on the assigned traffic channel. The UE may then use its CDMA radio to tune to the assigned channel and to engage in the CSFB call via CDMA.

As discussed above, in an alternate CSFB process, after the UE sends a CSFB extended service request message to the LTE femtocell 20, the LTE femtocell may transmit to the UE a "release-and-redirect" message, which directs the UE to leave the LTE RAN 16 and search for, find, and acquire connectivity in the CDMA RAN 18. To facilitate the UE searching for CDMA coverage, the LTE femtocell 20 may also send to the UE a scan-list specifying at least one CDMA femtocell of the one or more CDMA femtocells 26. In line with the discussion above, the SIB8 message broadcast by the LTE femtocell 20 may include the scan-list, or the LTE femtocell may send to the UE a control message that includes the scan-list. Once the UE has registered with the CDMA RAN 18, the CDMA RAN may then connect the CSFB call for the UE.

In accordance with the present disclosure, the LTE femtocell manager 22 (or another entity shown in the example communication system of FIG. 2) may engage in a process to establish which CDMA femtocells of the one or more CDMA femtocells 26 should be specified by the scan-list that the LTE femtocell 20 will provide to a UE served by the LTE femtocell to facilitate the UE transitioning to engage in a CSFB call served by the CDMA RAN 18. The LTE femtocell manager 22 may consider one or more factors as a basis for establishing the scan-list, such as whether a CDMA femtocell sits as a node on the same LAN as the LTE femtocell 20, whether a CDMA femtocell is geographically located within a predefined threshold distance of the LTE femtocell, and/or whether a CDMA femtocell operates with a whitelist, among other possibilities.

For instance, in such an implementation, the LTE femtocell manager 22 may identify a CDMA femtocell to include on the scan-list based on the CDMA femtocell sitting as a node on the same LAN as the LTE femtocell 20. To facilitate this, the LTE femtocell manager 22 may have stored data indicating a public IP address of the LAN on which the LTE femtocell 20 sits as a node, as well as data indicating public IP addresses of respective LANs on which each of the one or more CDMA femtocells 26 sit as nodes, as discussed above. Using this data, the LTE femtocell manager 22 can determine, for each of at least one CDMA femtocell, whether the LAN on which the CDMA femtocell sits as a node has the same public IP address as the LAN on which the LTE femtocell 20 sits as a node. The LTE femtocell manager 22 may then select at least one of the CDMA femtocells to include on the scan-list based on these determinations.

As discussed above, a person, company, or the like may own or operate a particular LAN, as well as the LTE femtocell 20 and one or more CDMA femtocells that each sits as nodes on that particular LAN. Thus, advantageously, establishing the scan-list based on a consideration of whether a CDMA femtocell sits as a node on the same LAN as the LTE femtocell 20 may help ensure that the UE engages in a CSFB call with a CDMA femtocell that is owned or operated by the same person, company, or the like that owns or operates the LTE femtocell.

In a further, more specific implementation of this process, the LTE femtocell manager 22 may first consider a distance between a CDMA femtocell and the LTE femtocell 20 before considering whether the CDMA femtocell sits as a node on the same LAN as the LTE femtocell. Advantageously, considering distance between the LTE femtocell 20 and CDMA femtocells when establishing the scan-list may help ensure that the CDMA femtocell with which the UE will engage in a CSFB call is located near the LTE femtocell that previously served the UE.

In this implementation, the LTE femtocell manager 22 may take into account one or more factors when considering the distance between a CDMA femtocell and the LTE femtocell 20. As an example, the femtocell manager 22 may take into account a geolocation of the CDMA femtocell with respect to a geolocation of the LTE femtocell 20. To facilitate this, the LTE femtocell manager 22 may have stored data indicating a geolocation of the LTE femtocell 20, as discussed above. Further, the LTE femtocell manager 22 may have stored, or otherwise may have access to (e.g., by querying the CDMA femtocell manager 28), data indicating respective geolocations of each of the one or more CDMA femtocells 26. Using this data, the LTE femtocell manager 22 can determine, for each of at least one CDMA femtocell, whether the geolocation of the CDMA femtocell is within the predefined threshold distance (e.g., fifty meters, one hundred meters, etc.) of the geolocation of LTE femtocell 20. The LTE femtocell manager 22 may then select at least one of the CDMA femtocells to include on the scan-list based on these determinations, such that the scan-list may specify only CDMA femtocells that are geographically located within the predefined threshold distance of the LTE femtocell 20. For example, the LTE femtocell manager 22 may select only CDMA femtocells that are geographically located within fifty meters of the LTE femtocell 20 to include on the scan-list.

As an additional or alternative factor, the LTE femtocell manager 22 may take into account a network distance between the LTE femtocell 20 and a CDMA femtocell, such as a network latency (e.g., a signal transmission time) between the LTE femtocell and the CDMA femtocell. For instance, a network latency may be determined by way of a PING process. In practice, the PING process may involve a network device transmitting to another network device an Internet Control Message Protocol (ICMP) echo request, or "PING message," and waiting for an ICMP echo response from the other network device. The latency is then a measurement of the round-trip time (RTT) between transmission of the PING message and receipt of the ICMP echo response. Further, in order for the network device to transmit the PING message to the other network device, the network device may need to know a network address (i.e., private IP address) of the other network device.

In general practice, network devices may not be able to PING another network device unless both network devices sit as nodes on the same LAN. If a network device is instructed to transmit a PING message to another network device that is not on the same LAN, the network device may receive no ICMP echo response from the other network device. However, if a network device transmits a PING message to another network device that is on the same LAN, the network device will receive an ICMP echo response. Therefore, in line with the discussion above, a network device may use the PING process as a basis for determining that another network device sits as a node on the same LAN as the network device.

In accordance with the disclosed methods, for instance, the LTE femtocell manager 22 may transmit to the LTE femtocell 20 a request for the LTE femtocell to transmit a PING message to each of at least one CDMA femtocell. If the LTE femtocell 20 receives an ICMP echo response from the CDMA femtocell, the LTE femtocell may notify the LTE femtocell manager 22 that the ICMP echo response was received. Such a notification may serve, in addition to the consideration of public IP addresses discussed above, as an indication that the CDMA femtocell sits as a node on the same LAN as the LTE femtocell. Thus, based on this notification, the LTE femtocell manager 22 may select the CDMA femtocell to be included on the scan-list.

Furthermore, in this implementation, the LTE femtocell manager 22 may transmit to the LTE femtocell 20 a request for the LTE femtocell to measure a latency between the LTE femtocell and each of at least one CDMA femtocell. To facilitate this, the LTE femtocell manager 22 may have stored a private IP address of each of the at least one CDMA femtocell, which the LTE femtocell manager may maintain or may receive from the CDMA femtocell manager in response to querying the CDMA femtocell manager for the private IP addresses. As such, the LTE femtocell manager 22 may provide the LTE femtocell 20 with a private IP address of each of the at least one CDMA femtocell. In response to receiving the request and a given private IP address, the LTE femtocell 20 may transmit a PING message to the CDMA femtocell that has the given private IP address and measure the latency (i.e., the RTT) between the LTE femtocell and the CDMA femtocell. The LTE femtocell 20 may then report to the LTE femtocell manager 22 the measured latency between the LTE femtocell and the CDMA femtocell. In response to receiving the report, the LTE femtocell manager 22 may determine whether the latency is lower than a predefined threshold (e.g., 40 milliseconds, 60 milliseconds, etc.). Accordingly, by this PING process, the LTE femtocell manager 22 can determine, for each of at least one CDMA femtocell, whether the latency between the LTE femtocell 20 and the CDMA femtocell is lower than a predefined threshold. The LTE femtocell manager 22 may then select at least one of the CDMA femtocells to include on the scan-list based on these determinations. For instance, if the LTE femtocell manager 22 determines that the latency between the LTE femtocell 20 and a CDMA femtocell is lower than the predefined threshold, the LTE femtocell manager may select that CDMA femtocell to include on the scan-list.

As yet another factor, the LTE femtocell manager 22 may take into account a pilot signal strength of a CDMA femtocell, in addition to or alternative to taking into account geolocation and/or network latency. To facilitate this in practice, for instance, the LTE femtocell manager 22 may maintain a database of (or otherwise have access to, such as by querying the CDMA femtocell manager 28) identifiers of the one or more CDMA femtocells 26 (e.g., PN offsets or physical cell identifiers). Such identifiers may be the same type of identifiers ultimately specified in the scan-list, as discussed above. Further, the LTE femtocell manager 22 may also have stored data indicating a geolocation of the one or more CDMA femtocells, as discussed above. Using this data, the LTE femtocell manager 22 may transmit to the LTE femtocell 20 a request for the LTE femtocell to report threshold high pilot signal strengths of the at least one CDMA femtocell, the request indicating a list of identifiers of at least one CDMA femtocell. Further, in some scenarios, the LTE femtocell manager 22 may transmit a request for the LTE femtocell 20 to report threshold high pilot signal strengths of at least one CDMA femtocell that is geographically located within a threshold distance of the LTE femtocell, where the threshold distance may be the same as or different from the predefined threshold distance discussed above.

The pilot signal strength that the LTE femtocell manager 22 and/or LTE femtocell 20 considers to be "threshold high" may vary. By way of example, when the pilot signal strength is measured as a received signal strength indicator (RSSI) value in dBm, any RSSI value that is greater than −80 dBm may be considered threshold high. As another example, when the pilot signal strength is measured as $E_c/I_o$, where $E_c$ is energy per CDMA chip for the pilot signal of a given wireless coverage area and $I_o$ is the total power received, any $E_c/I_o$ value that is greater than −10 dB may be considered threshold high. Other thresholds are possible as well, and other methods of measuring signal strength are also possible.

In response to receiving the request, the LTE femtocell 20 may, for each of the at least one CDMA femtocell identified in the request, (i) scan a pilot signal broadcast by the CDMA femtocell to measure the pilot signal strength and (ii) determine whether the measured pilot signal strength is threshold high. If the identifier for a CDMA femtocell included in the request is a PN offsets, for instance, the LTE femtocell 20 may scan for the pilot signal encoded (e.g., modulated) by that CDMA femtocell's PN offset, measure the pilot signal strength, and determine whether the measured pilot signal strength is threshold high. The LTE femtocell 20 may then transmit back to the LTE femtocell manager 22 a report of pilot signals that have threshold high signal strength, the report also indicating identifiers of the corresponding CDMA femtocells.

Alternatively, in response to receiving the request, the LTE femtocell 20 may provide the list of identifiers to one or more UEs served by the LTE femtocell along with a request for the one or more UEs to report threshold high pilot signal strengths of the identified at least one CDMA femtocell. The one or more UEs may scan the pilot signals of the identified at least one CDMA femtocell (e.g., scan for the pilot signal encoded by the respective PN offsets) and transmit back to the LTE femtocell 20 a report of pilot signals that have threshold high signal strength, the report also indicating identifiers of the corresponding CDMA femtocells. The LTE femtocell may then transmit the report to the LTE femtocell manager 22. In either scenario, based on the report received from the LTE femtocell 20, the LTE femtocell manager 22 may select only CDMA femtocells that are broadcasting pilot signals that have threshold high signal strengths to be included on the scan-list.

As an example of this implementation, the LTE femtocell manager 22 may first determine, for each of at least one CDMA femtocell, whether the CDMA femtocell is geographically located within a predefined threshold distance of the LTE femtocell 20. The LTE femtocell manager 22 may then determine, for each CDMA femtocell that the LTE femtocell manager determined to be geographically located within the predefined threshold distance of the LTE femtocell 20, whether the CDMA femtocell sits as a node on the same LAN as the LTE femtocell. Based on these determinations, the LTE femtocell manager 22 may select only CDMA femtocells that (i) are geographically located within the predefined threshold distance of the LTE femtocell 20 and (ii) sit as nodes on the same LAN as the LTE femtocell to include in the scan-list. Other examples of this more specific implementation are possible as well, including but not limited to examples in which the LTE femtocell manager 22 may take into account one or more of the factors noted above other than geolocation.

At issue with this implementation, however, is whether the LTE femtocell manager 22 should include on the scan-list CDMA femtocells that are within a threshold distance from the LTE femtocell 20, but sit as nodes on a different LAN than the LTE femtocell. This may be an issue because, in practice, an owner or operator of a LAN and the CDMA femtocells that sit as nodes on that LAN may not desire for certain devices (e.g., UEs) to be able to register with those CDMA femtocells. Thus, those CDMA femtocells may each maintain an access control list such as a whitelist, which network engineers, wireless carriers, owners, operators, or the like may populate with identifiers associated with UEs that are authorized to use the CDMA femtocell. Alternatively, a femtocell manager (e.g., a CDMA femtocell manager) may maintain the respective whitelists of those CDMA femtocells. These lists could be updated from time to time for various reasons.

As such, whitelists may prevent UEs from being served by a particular CDMA femtocell when the UE seeks to transition to engage in a CSFB call served by that particular CDMA femtocell. For instance, when a UE sends an attach request to the particular CDMA femtocell, the CDMA femtocell manager 28, which may have stored data indicating a whitelist of the particular CDMA femtocell, may inform the UE that the attach request has been denied if the whitelist specifies that the UE is unauthorized to register with the particular CDMA femtocell.

Accordingly, in an even more specific implementation of this process, after the LTE femtocell manager 22 considers whether the CDMA femtocell sits as a node on the same LAN as the LTE femtocell, the LTE femtocell manager may consider whether the CDMA femtocell operates with a whitelist. By way of example, the LTE femtocell manager 22 may determine, for each of at least one CDMA femtocell, whether the CDMA femtocell sits as a node on the same LAN as the LTE femtocell 20. And, if the LTE femtocell manager 22 determines that the CDMA femtocell sits as a node on the same LAN as the LTE femtocell 20, the LTE femtocell manager may then select the CDMA femtocell to be included on the scan-list. However, if the LTE femtocell manager 22 determines that the CDMA femtocell does not sit as a node on the same LAN as the LTE femtocell 20 (e.g., sits as a node on a different LAN), the LTE femtocell manager may responsively determine whether the CDMA femtocell operates with a whitelist. To facilitate this, the LTE femtocell manager 22 may have stored, or otherwise may have access to (e.g., by querying the CDMA femtocell manager 28), data indicating respective whitelists of each of the one or more CDMA femtocells 26, as discussed above. Using the data indicating the respective whitelists, the LTE femtocell manager 22 may determine that the CDMA femtocell, which does not sit as a node on the same LAN as the LTE femtocell 20, also does not operate with a whitelist. The LTE femtocell manager 22 may then responsively select the CDMA femtocell to be included on the scan-list. If the LTE femtocell manager 22 determines that the CDMA femtocell, which does not sit as a node on the same LAN as the LTE femtocell 20, does operate with a whitelist, the LTE femtocell manager may responsively determine that the CDMA femtocell should not be selected to be included on the scan-list. Advantageously, this may help a UE transition to engage in a CSFB call served by a CDMA femtocell even if no CDMA femtocells near the LTE femtocell 20 are on the same LAN as the LTE femtocell, provided that the CDMA femtocell does not restrict UEs from being served by the CDMA femtocell.

As a more specific example of this implementation, the LTE femtocell manager 22 may first identify a set of at least one CDMA femtocell that is within a threshold distance from the LTE femtocell 20, based on a consideration of at least one of the factors noted above. For instance, the LTE femtocell manager 22 may identify the set based on a determination that, for each of the at least one CDMA femtocell, the CDMA femtocell is geographically located within a predefined threshold distance of the LTE femtocell 20. Next, of that set of at least one CDMA femtocell, the LTE femtocell manager 22 may identify a subset of at least one CDMA femtocell based on a consideration of whether respective CDMA femtocells of the set (i) sit as nodes on the same LAN as the LTE femtocell 20 and (ii) operate with a whitelist. For instance, the LTE femtocell manager 22 may identify the subset based on a determination that, for each CDMA femtocell of the set, the CDMA femtocell either (i) sits as a node on the same LAN as the first femtocell or (ii) sits as a node on a different LAN, but does not operate with a whitelist. Then, the LTE femtocell manager 22 may select the identified subset of at least one CDMA femtocells to be included on the scan-list.

It should be understood that, in some implementations of the process such as, the LTE femtocell 20 itself may perform any or all of the operations described above, either instead of the LTE femtocell manager 22 or cooperative with the LTE femtocell manager. By way of example, after powering on, the LTE femtocell 20 may send a query to the LTE femtocell manager 22 for data stored at the LTE femtocell manager, such as data indicating public IP addresses, private IP addresses, geolocations, whitelists, and the like of respective CDMA femtocells. The LTE femtocell manager 22 may responsively send the LTE femtocell 20 such data. For instance, the LTE femtocell manager 22 may send the LTE femtocell 20 only data associated with CDMA femtocells that sit as nodes on the same LAN as the LTE femtocell, and not data associated with CDMA femtocells that do not sit as nodes on the same LAN as the LTE femtocell. The LTE femtocell 20 may then use the data as a basis for determining which CDMA femtocells that the scan-list should specify, in accordance with one or more of the operations described above.

Moreover, the LTE femtocell 20 may request that the LTE femtocell manager 22 perform any or all of the operations described above. By way of example, after powering on, the LTE femtocell 20 may transmit to the LTE femtocell manager 22 a signal indicating a request for the LTE femtocell manager to determine which CDMA femtocells that the scan-list should specify. In response to receiving the signal, the LTE femtocell manager 22 may responsively perform one or more of the operations. As another example, the LTE femtocell manager 22 may identify a set of CDMA femtocells based on one or more of the factors/considerations discussed above. The LTE femtocell manager 22 may then instruct the LTE femtocell 20 to identify a subset of CDMA femtocells from that set, based on one or more of the factors/considerations discussed above. Conversely, the LTE femtocell 20 may first identify a set of CDMA femtocells, and then request that the LTE femtocell manager 22 identify a subset of CDMA femtocells from that set. In either case, the subset may then be included on the scan-list. Other examples are possible as well.

Figure 3:
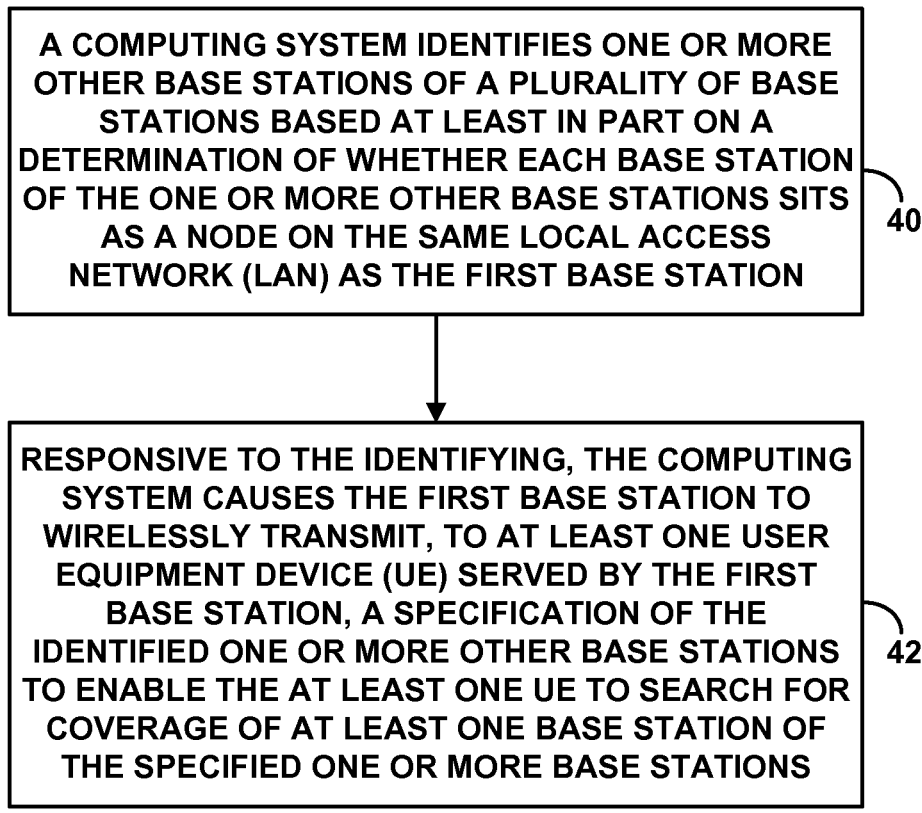
FIG. 3 is a flow chart depicting operations that can be carried out in accordance with the present methods.

FIG. 3 is next a flow chart depicting operations that can be carried out in accordance with this description. Namely, the operations may be carried out by a computing system in a communication system comprising a plurality of base stations, where the plurality of base stations includes a first base station that sits as a node on a LAN. As shown in FIG. 3, at block 40, the computing system identifies one or more other base stations of the plurality of base stations based at least in part on a determination of whether each base station of the one or more other base stations sits as a node on the same LAN as the first base station. And, at block 42, responsive to the identifying, the computing system causes the first base station to wirelessly transmit, to at least one UE served by the first base station, a specification of the identified one or more other base stations to enable the at least one UE to search for coverage of at least one base station of the specified one or more base stations.

In this method, the base stations at issue may be femtocells, such as a first femtocell of a first RAN (e.g., an LTE RAN) and one or more second femtocells of a second RAN (e.g., a CDMA or GSM RAN). Further, the computing system at issue may be a computing system arranged to control operations of a femtocell system, such as a femtocell system that includes a first femtocell and perhaps further includes a femtocell server (e.g., the LTE femtocell manager 22).

Figure 4:
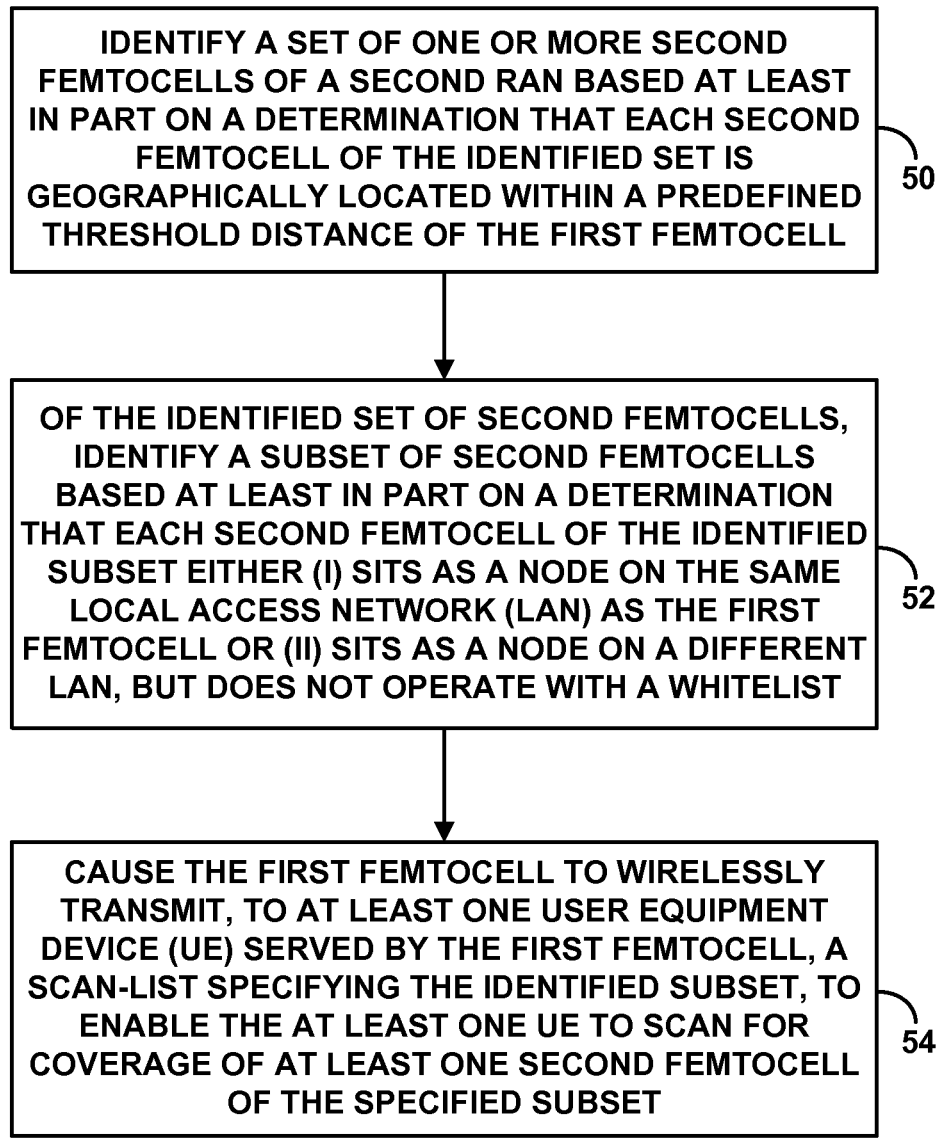
FIG. 4 is another flow chart depicting operations that can be carried out in accordance with the present methods.

FIG. 4 is next a flow chart depicting operations that can be carried out in accordance with this description. Namely, the operations may be carried out by a femtocell system that includes a first femtocell of a first RAN, and perhaps additionally includes a femtocell server/manager (e.g., LTE femtocell manager 22). As shown in FIG. 4, at block 50, the femtocell system identifies a set of one or more second femtocells of a second RAN based at least in part on a determination that each second femtocell of the identified set is geographically located within a predefined threshold distance of the first femtocell. At block 52, of the identified set of second femtocells, the femtocell system identifies a subset of second femtocells based at least in part on a determination that each second femtocell of the identified subset either (i) sits as a node on the same LAN as the first femtocell or (ii) sits as a node on a different LAN, but does not operate with a whitelist. And, at block 54, the femtocell system causes the first femtocell to wirelessly transmit, to at least one UE served by the first femtocell, a scan-list specifying the identified subset, to enable the at least one UE to scan for coverage of at least one second femtocell of the specified subset.

In line with the discussion above, in some implementations, each of the operations depicted in the flow chart of FIG. 4 may be performed by the first femtocell (e.g., the LTE femtocell 20). In other implementations, each of the operations may be performed by the femtocell server (e.g., the LTE femtocell manager 22). In still other implementations, at least one of the operations may be performed by the first femtocell, and at least one other of the operations may be performed by the femtocell server.

As noted above, it should be understood that in some scenarios, the femtocell system (e.g., the LTE femtocell 20 and/or the LTE femtocell manager 22) may establish that only a single second femtocell should be included in the scan-list. However, in scenarios where multiple second femtocells are included in the scan-list, the femtocell system may rank these multiple second femtocells by priority, taking into account various considerations. For example, the multiple second femtocells included on the scan-list may be ranked by one or more of: pilot signal strength, distance from the first femtocell, lowest latency, usage of the second femtocell in a given epoch (e.g., a day or a week) or other capacity measurements, among other possibilities. With regard to usage of the second femtocell, for instance, second femtocells that have threshold low usage, or "busy hours," per day may be prioritized higher (e.g., less than 13 "busy hours" per day).

Figure 5:
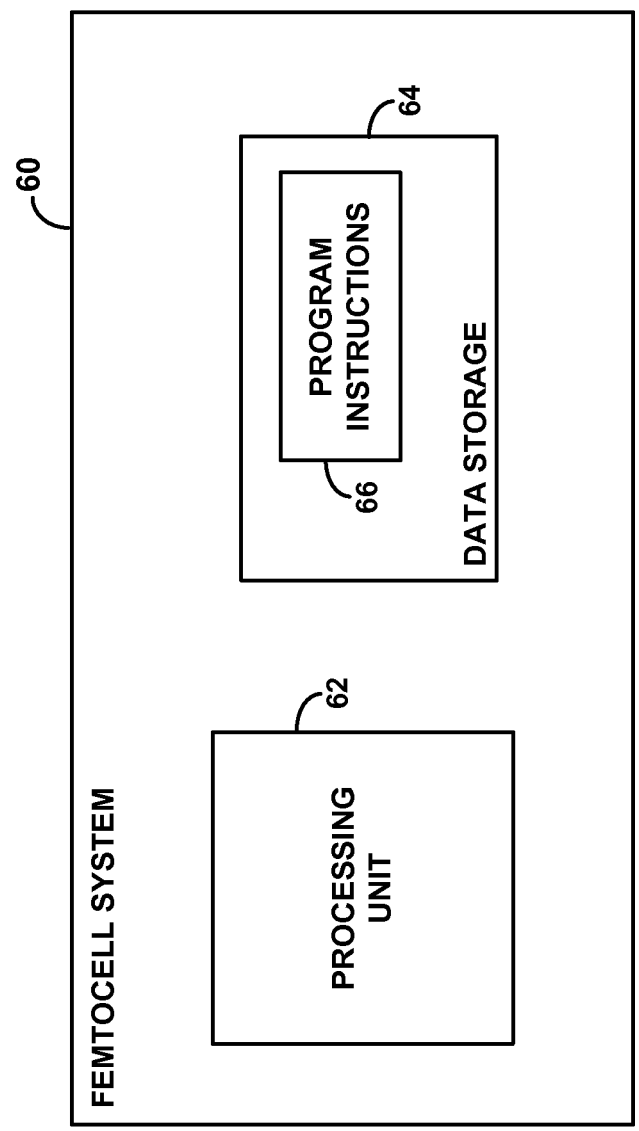
FIG. 5 is a simplified block diagram of an example femtocell system arranged to implement aspects of the present methods.

FIG. 5 is a simplified block diagram of a representative femtocell system 60 arranged to implement aspects of the present methods. Without limitation, the example femtocell system 60 may be a first femtocell (e.g., an LTE femtocell) that is arranged to serve UEs over a first air interface protocol and that may sit as a node on a LAN. Alternatively, the example femtocell system 60 may include both a first femtocell and a femtocell server (e.g., an LTE femtocell manager) that is in communication with at least the first femtocell. Alternatively still, the example femtocell system 60 may be a first femtocell and a femtocell server that are integrated together. Further, although these components are shown as discrete blocks in the figure, in practice the components could be integrated together in various ways and/or distributed, replicated, or arranged in some other manner, such as distributed between a first femtocell and a femtocell server.

The example femtocell system 60 may include various combinations of hardware, firmware, and/or software, such as a processing unit 62 and non-transitory data storage 64, to cause the device to carry out various functions described herein, and may be integrated with one or more other communication server components. The processing unit 62 may comprise one or more general purpose processors (such as microprocessors) and/or one or more special purpose processors (e.g., application specific integrated circuits). And the data storage 64 may comprise one or more volatile and/or non-volatile storage components, such as optical, magnetic, or flash storage. As shown, the data storage 64 may hold program instructions 66 that are executable by processing unit 62 to carry out various operations described herein.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for controlling which base stations are specified in a scan-list that is transmitted by a first base station of a plurality of base stations, the method comprising:
   identifying, by a computing system, one or more other base stations of the plurality based at least in part on a determination that each base station of the identified one or more other base stations (i) is geographically located within a predefined threshold distance of the first base station and (ii) is a node on a local area network (LAN) on which the first base station is a node, the LAN being a network of locally interconnected nodes each having a respective Internet Protocol (IP) address associated with the LAN;
   based on the identifying, establishing a scan-list that specifies the identified one or more other base stations; and
   responsive to the establishing, the computing system causing the first base station to wirelessly transmit, to at least one user equipment device (UE) served by the first base station, the scan-list specifying the identified one or more other base stations to enable the at least one UE to search for coverage of at least one base station of the specified one or more base stations.

2. The method of claim 1, wherein the LAN on which the first base station sits as a node has a public IP address, and wherein the determination that each base station of the identified one or more other base stations is one of the nodes of the LAN comprises a determination, based on each base station of the identified one or more other base stations having the same public IP address as the LAN, that each base station of the identified one or more other base stations is one of the nodes of the LAN.

3. The method of claim 1, wherein the communication system includes a first radio access network (RAN) and a second RAN, wherein the first RAN includes the first base station and the second RAN includes the one or more other base stations of the plurality, wherein the specification is a circuit-switched fallback (CSFB) scan-list, and wherein the first base station is configured to transmit the CSFB scan-list to the at least one UE to facilitate the at least one UE transitioning to engage in a CSFB call served by the second RAN.

4. The method of claim 1, wherein the communication system includes a first radio access network (RAN) and a second RAN, wherein the first RAN includes the first base station and the second RAN includes the one or more other base stations of the plurality, wherein the first RAN is a Long Term Evolution (LTE), and wherein the second RAN is selected from the group consisting of a Code Division Multiple Access (CDMA) RAN and a Global System for Mobile Communications (GSM) RAN.

5. The method of claim 1, wherein the first base station is a first femtocell, and wherein the one or more other base stations of the plurality are one or more other femtocells.

6. A method for controlling which base stations are specified in a scan-list that is transmitted by a first base station of a first radio access network (RAN), the method comprising:
   determining one or more second base stations of a second RAN the first base station should specify in the scan-list, wherein the determining is based at least in part on each base station of the determined one or more second base stations (i) being geographically located within a predefined threshold distance of the first base station and (ii) being a node on a local area network (LAN) on which the first base station is a node, the LAN being a network of locally interconnected nodes each having a respective Internet Protocol (IP) address associated with the LAN;
   causing the first base station to specify the determined one or more second base stations in the scan-list,
   wherein the first base station is configured to transmit the scan-list to at least one user equipment device (UE) served by the first base station, so as to enable the at least one UE to scan for coverage of the second RAN.

7. The method of claim 6, wherein the first base station is configured to transmit the scan-list by broadcasting a System Information Block #8 (SIB8) message including the scan-list.

8. The method of claim 6, wherein the first base station is configured to transmit the scan-list as part of a control message that, upon receipt by the at least one UE served by the first base station, triggers the at least one UE to scan for coverage of at least one second base station of the specified one or more second base stations.

9. The method of claim 6, wherein the scan-list is a circuit-switched fallback (CSFB) scan-list, wherein the first RAN is a Long Term Evolution (LTE), and wherein the second RAN is selected from the group consisting of a Code Division Multiple Access (CDMA) RAN and a Global System for Mobile Communications (GSM) RAN.

10. A femtocell system comprising:
a first femtocell of a first radio access network (RAN), wherein the first femtocell is arranged to serve user equipment devices (UEs) over a first air interface protocol, and wherein the first femtocell sits as a node on a local area network (LAN), the LAN being a network of locally interconnected nodes each having a respective Internet Protocol (IP) address associated with the LAN;
a femtocell server that is in communication with at least the first femtocell;
at least one processor;
data storage; and
program instructions stored in the data storage and executable by the at least one processor to cause the femtocell system to perform operations comprising:
identifying a set of one or more second femtocells of a second RAN based at least in part on a determination that each second femtocell of the identified set is geographically located within a predefined threshold distance of the first femtocell, wherein each of the one or more second femtocells is arranged to serve UEs over a second air interface protocol,
of the identified set of second femtocells, identifying a subset of second femtocells based at least in part on a determination that each second femtocell of the identified subset either (i) is one of the nodes of the LAN or (ii) is a node of a different LAN, but does not operate with a whitelist, and
causing the first femtocell to wirelessly transmit, to at least one UE served by the first femtocell, a scan-list specifying the identified subset, to enable the at least one UE to scan for coverage of at least one second femtocell of the specified subset.

11. The femtocell system of claim 10, wherein at least one of the operations is performed by the first femtocell and at least one other of the operations is performed by the femtocell server.

12. The femtocell system of claim 10, wherein identifying the subset of second femtocells is further based on a determination that each second femtocell of the identified set is broadcasting a pilot signal that has a threshold high signal strength.

13. The femtocell system of claim 10, wherein the femtocell server has stored data indicating one or more of: a public IP address of the LAN on which the first femtocell sits as a node, public IP addresses of respective LANs on which each of the one or more second femtocells sits as a node, geographic coordinates of the first femtocell and the one or more second femtocells, and whether respective second femtocells of the one or more second femtocells operate with a whitelist, and wherein identifying the set of the one or more second femtocells and the subset of second femtocells comprises:
the first femtocell transmitting, to the femtocell server, a query for the data stored at the femtocell server,
in response to the transmitting, the first femtocell receiving the data, and
the first femtocell using the data as a basis for making the determination that each second femtocell of the identified set is geographically located within the predefined threshold distance of the first femtocell and for making the determination that each second femtocell of the identified subset either (i) is one of the nodes of the LAN or (ii) is a node of a different LAN, but does not operate with a whitelist.

14. The femtocell system of claim 10, wherein the femtocell server has stored data indicating one or more of: a public IP address of the LAN on which the first femtocell sits as a node, public IP addresses of respective LANs on which each of the one or more second femtocells sits as a node, geographic coordinates of the first femtocell and the one or more second femtocells, and whether respective second femtocells of the one or more second femtocells operate with a whitelist, and wherein identifying the set of the one or more second femtocells and the subset of second femtocells comprises:
the first femtocell transmitting, to the femtocell server, a signal indicating a request for the femtocell server to identify which one or more of the second femtocells the first femtocell should specify in the scan-list, and
in response to receiving the signal, the femtocell server using the data as a basis for making the determination that each second femtocell of the identified set is geographically located within the predefined threshold distance of the first femtocell and for making the determination that each second femtocell of the identified subset either (i) is one of the nodes of the LAN or (ii) is a node of a different LAN, but does not operate with a whitelist.

15. The femtocell system of claim 10, wherein identifying the set of the one or more second femtocells comprises:
the first femtocell transmitting a PING message to each of at least one second femtocell of the one or more second femtocells,
in response to the transmitting, the first femtocell determining respective latencies for each of the PING messages between the first femtocell and each second femtocell of the at least one second femtocell are threshold low, and
for each second femtocell of the at least one second femtocell, (i) making a determination of whether the respective latency of the PING message between the first femtocell and the second femtocell is threshold low and (ii) based on the determination being that the respective latency of the PING message between the first femtocell and the second femtocell is threshold low, deeming the second femtocell to be a member of the set.

16. The femtocell system of claim 10, wherein the first femtocell is configured to transmit the scan-list as part of a message selected from the group consisting of a System Information Block #8 (SIB8) message and a control message, wherein the control message, upon receipt by the at least one UE served by the first femtocell, triggers the at least one UE to scan for coverage of at least one second femtocell of the specified subset.

* * * * *